Sept. 12, 1961          L. C. BROWN          2,999,977

NUCLEAR MAGNETIC RESONANCE MEASURING SYSTEM

Filed May 20, 1958

INVENTOR
Leonard C. Brown

United States Patent Office — 2,999,977 Patented Sept. 12, 1961

2,999,977
NUCLEAR MAGNETIC RESONANCE MEASURING SYSTEM
Leonard C. Brown, Columbus, Ohio, assignor to Industrial Nucleonics Corporation, a corporation of Ohio
Filed May 20, 1958, Ser. No. 736,632
10 Claims. (Cl. 324—.5)

This invention relates to measuring apparatus, and in particular to an improved magnet and coil assembly for "conditioning flat sheet material" to be analyzed by measurement of various phenomena occurring in response to nuclear magnetic resonance.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a constant uniform external magnetic field, the spinning nuclei tend to precess around an axis parallel to the magnetic field with a characteristic frequency and with random phase. Initially the resulting polarization is zero, but, after a characteristic time, damping forces cause an excess of nuclei to exhibit a magnetic component in the direction of the external field. In the event the polarized nuclei are subjected to a radio-frequency magnetic field at right angles to the external field and at the frequency of nuclear precession, phase coherence is introduced among the nuclei with the result that the induced polarization precesses about the external field direction with a corresponding loss of energy in the radio-frequency field.

Prior investigators have studied the gyroscopic properties of nuclei by subjecting an element to a magnetic field produced by a permanent magnet or electromagnet and simultaneously irradiating the element with radio-frequency electromagnetic energy emanating from a tank coil.

When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present, other things being equal. Apparatus of this type can be used for the quantitative determination of any element the nucleus of which possesses angular momentum and magnetic moment, such as for example, $H^1$, $H^2$, $He^3$, $Li^6$, $Li^7$, $Be^9$, $B^{10}$, $B^{11}$, $N^{14}$, etc. Additionally, quantitative determination of numerous isotopes of elements can also be made, because in all cases the different isotopes possessing non-zero magnetic moments have different resonant frequencies in the same external field.

The absorption phenomenon of nuclear magnetic resonance is also used to measure constituent proportions in various compounds. For example, moisture content measurements can be made in materials, such as tobacco or paper. In such a determination the water content is not measured directly but, rather, the hydrogen content of the water; the hydrogen in the material is distinguished from the hydrogen in water on the basis of widely differing absorption patterns. By applying the same principles it is possible to measure the presence of any compound which contains at least one element the nucleus of which possesses angular momentum and magnetic moment.

In one type of conventional nuclear magnetic resonance apparatus, radio-frequency current from a constant-current source is supplied to a parallel tuned circuit consisting of a coil and capacitor. The tank coil, ordinarily a solenoid or Helmholtz pair, is placed within the uniform external field of a permanent magnet so that the radio-frequency field is perpendicular to the external field, and the material to be measured is placed within the coil.

The frequency of the radio-frequency field, or the magnitude of the external field, is modulated at a slow audio rate. When the radio-frequency and the magnetic fields satisfy the relation $W_1 = \gamma H_0$, where "$W_1$" is the angular velocity of the radio-frequency field $H_1$, "$H_0$" is the permanent magnetic field strength in gauss, and "$\gamma$" is a constant dependent on the type of nucleus subjected to resonance, nuclear magnetic resonance occurs.

The resulting nuclear resonance causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

With a given amount of absorbing substance, the magnitude of voltage change is proportional to the radio-frequency field strength provided that saturation does not occur. It is therefore desirable to maintain the field strength to as high a value as possible without attaining saturation.

The use of nuclear magnetic resonance for the measurement of moisture or other characteristics of sheet material presents the problem of subjecting a cross section of the sheet to the mutually perpendicular radio-frequency and external fields which satisfy the requirements for nuclear resonance. Since it is physically impossible to place a large sheet of material within a radio-frequency coil of the solenoidal type where the field has its highest, most uniform concentration, the sheet in many prior art arrangements is subjected to the field extending from the end of the coil (where the field is dispersed) thus greatly decreasing the sensitivity of the measuring device.

The disposition of the pole pieces required to generate a magnetic field $H_0$ perpendicular to the radio-frequency field $H_1$ has also dictated several compromise magnet and coil assemblies which have resulted in relatively poor signal-to-noise ratios in the measurement of sheet material.

Additionally, optimum signal-to-noise ratios and accurate measurements are obtained when the largest possible portion of the total radio-frequency field $H_1$ is placed in the sheet portion under test, or in other words a high "filling factor" is desired. Another important requirement is to obtain a radio-frequency field $H_1$ that is reasonably uniform with respect to possible changes in the relative position of the test sample. In the case of a continuous flat sheet, this undesirable change in relative position is attained by movement in a direction perpendicular to the sheet. Magnet and coil assemblies heretofore employed have not provided fully satisfactory measurements in sheet material because of the inability to adequately meet these requirements.

Accordingly, a principal object of this invention is to improve the signal-to-noise ratio and the accuracy of nuclear magnetic resonance sheet measuring apparatus.

Another object is to provide an improved magnet and coil assembly for nuclear magnetic resonance measuring apparatus that is advantageously adapted for the testing of sheet material.

Another object is to provide a magnet and coil assembly of substantially improved efficiency for nuclear magnetic resonance measuring apparatus that subjects the material under test to higher external field intensities of better homogeneity.

A preferred embodiment of the magnet and coil assembly of this invention comprises a pair of relatively flat coils disposed between a pair of spaced magnet pole pieces. The coils are axially aligned and closed spaced in a parallel relationship with respect to one another. Both coils are included in a resonant tank circuit that develops an output signal in response to a condition of nuclear magnetic resonance in sheet material positioned between the coils.

The coils are connected in a reverse sense so that their respective radio-frequency magnetic fields are in opposition or "bucking." This connection provides radio-frequency magnetic flux between the two coils which is essentially radial to the common axis of the two coils except at points near the axis and beyond the outer perimeter of the coils. The sample sheet under test is preferably disposed in the median plane between the coils that is perpendicular to the common axis of the coils. The resulting lines of flux emanating from the two coils thus lie in the plane of the material under test.

Due to the increased flux density between the coils a satisfactory "filling factor" is obtained with coil spacings of a few sample thicknesses. This coil size and disposition provide a more efficient spacing of the pole pieces generating the external magnetic field with consequently higher field intensities and better homogeneity. Both of these effects enhance the signal-to-noise ratio and the accuracy of the measuring apparatus.

In order that all of the features for attaining the objects of this invention may be readily understood, reference is herein made to the drawings wherein.

Figure 1:
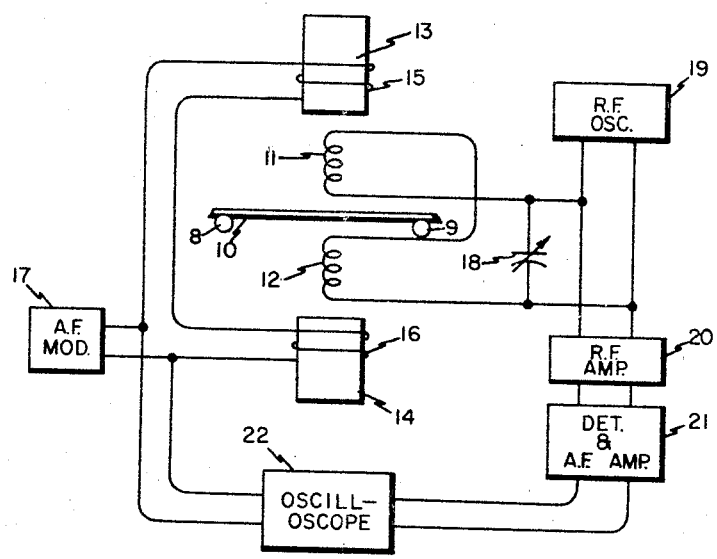
FIG. 1 is a simplified circuit diagram of nuclear magnetic resonance measuring apparatus employing the improved magnet and coil assembly of this invention.

Referring now to the simplified showing of the measuring apparatus of FIG. 1 incorporating the magnet and coil assembly of this invention, sheet material 10 under test is carried by a pair of rolls 8 and 9 and positioned midway between radio-frequency sampling coils 11 and 12. The coils 11 and 12 are axially aligned and disposed in a parallel relationship with respect to one another. For reasons hereinafter outlined in detail, material 10 is subjected to a radio-frequency field $H_1$ radial to the axis of the coils and within the plane containing the sheet. Material 10 is also subjected to a magnetic field $H_0$ developed in the gap between external magnets 13 and 14. Field $H_0$ is perpendicular to the radial components of the radio-frequency field $H_1$.

Modulation coils 15 and 16 envelop the pole ends of magnets 13 and 14, respectively, so that the otherwise steady magnetic field is amplitude modulated by the audio-frequency energy supplied from modulation source 17.

Capacitor 18 shunts coils 11 and 12 so that the combination 11, 12, 18 forms a parallel-resonant tank circuit connected to the output of constant-current radio-frequency oscillator 9. Other circuit arrangements may be apparent such as connecting coils 11 and 12 in parallel with the connection to the condenser 18 either in series or in parallel. Alternately the coils 11 and 12 may be independently resonated with two separate condensers and coupled together in an opposing sense by means of identical transmission lines from a common radio-frequency source properly matched in impedance to the source and to the resonant circuits.

The tank circuit is tuned to the oscillator frequency and therefore a substantial radio-frequency voltage appears across the tank circuit. This voltage has a constant amplitude except during those periodic instances at which the output frequency of oscillator 19 and the modulated magnetic field generated by the magnets 13 and 14 and modulation coils 15 and 16 satisfy the requirements for nuclear resonance.

During resonance, material 10 absorbs energy from the radio-frequency field so as to periodically load coils 11 and 12. As is well known, the loading of a parallel tank circuit lowers the "Q" of the tank, thereby reducing the parallel impedance appearing across the tank circuit. The periodic absorption of energy by material 10 thus amplitude codulates the radio-frequency voltage appearing across tank circuit 11, 12, 18. The amplitude of this modulation component varies in accordance with the number of nuclei present in the material 10 to absorb energy from tank coils 11 and 12.

The voltage appearing across tank circuit 11, 12, 18 is applied to the input of radio-frequency amplifier 20. The signal output of radio-frequency amplifier 20 is in turn applied to the input of detector and audio-frequency amplifier 21. This latter unit develops an audio-frequency corresponding to the modulation component introduced by absorption variations in material 10. This signal is applied to the vertical amplifier of oscilloscope 22.

The horizontal sweep of oscilloscope 22 is synchronized to the periodic vertical voltage pulses by applying a voltage from modulation source 17 to appropriate horizontal sweep terminals of the oscilloscope. Accordingly, a stationary pulse appears on the screen of the oscilloscope which has an amplitude responsive to variations in the absorption characteristics of the material 10 under test.

Figure 2:
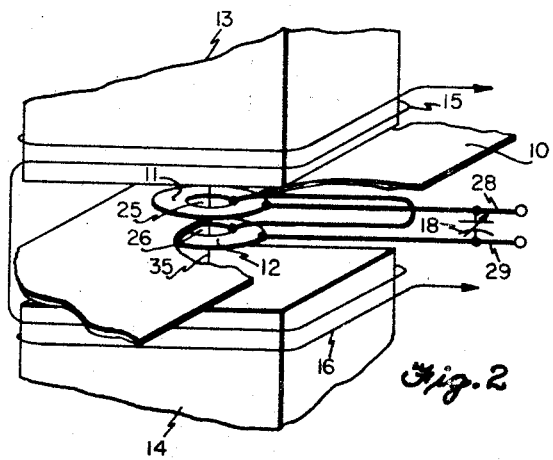
FIG. 2 is a perspective view showing the improved arrangement herein of the magnet pole pieces and the radio-frequency coils relative a sheet of material under test.

An enlarged perspective view of the magnet and coil assembly of this invention is shown in FIG. 2. Sheet 10 is disposed midway between the faces of the magnet pole pieces 13 and 14 and also midway between the adjacent end surfaces of radio-frequency coils 11 and 12. The sheet moves in a plane parallel to the adjacent faces of the magnet pole pieces and also the adjacent surfaces of radio-frequency coils 11 and 12. Conventional means may be employed for moving sheet 10 throughout the required plane, the essential requirement being that the sheet preferably be maintained in the relative position set forth.

Radio-frequency coils 11 and 12 are spiral-wound so that end openings 25 and 26 are formed therein, respectively. Satisfactory operation may be obtained with coil thicknesses that are relatively flat as shown. The coils 11 and 12 are also shown as circular or spiral in the plane of the coil but may be square, rectangular, oval or any other configuration to obtain the most effective "filling factor." The sole requirement is that the coils be essentially parallel and are images of one another.

The two coils 11 and 12 may both be real physical coils as shown or one of the coils and its associated radio-frequency field may be an electrical image of the other real physical coil, the electrical image being formed by the well known method of placing a metallic conducting sheet in the position of the median plane. In this case the sample sheet must be slightly displaced from the median plane in the direction of the physical coil.

It should be noted that coils 11 and 12 are reversely connected inasmuch as conductor 27 connects the upper center output lead of coil 12 with the corresponding lead of coil 11. Output connections to both reversely connected coils 11 and 12 are made to the outer conductors 28 and 29. Capacitor 18 is connected across conductors 28 and 29 so that a parallel resonant tank combination 11, 12, 18 is formed.

The steady magnetic field $H_0$ generated by magnet pole pieces 13 and 14 is parallel to the common longitudinal axis 35 of coils 11 and 12 and perpendicular to the surfaces of sheet 10. Modulation coils 15 and 16 are wound around the terminal ends of the pole pieces 13 and 14, respectively, so that the otherwise steady magnetic field $H_0$ may be amplitude modulated.

Figure 3:
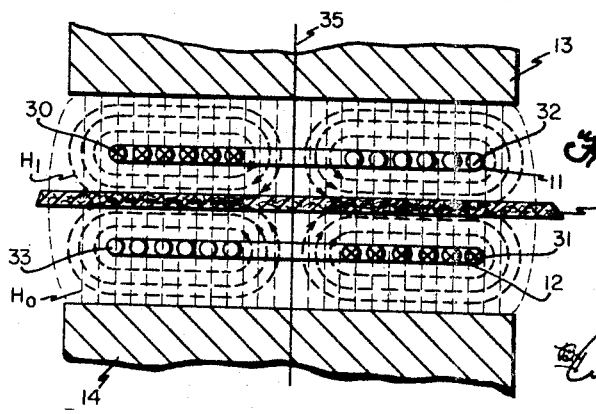
FIG. 3 is a cross-sectional view of the magnetic and radio-frequency fields generated by the magnet coil and coil assembly of FIG. 2.

FIG. 3 shows a diagram of the fields $H_0$ and $H_1$ generated by the magnet pole pieces 13 and 14 and radio-frequency coils 11 and 12. The X-marked conductors 30 of coil 11 and the X-marked conductors 31 of coil 12 are those conductors in which current flows into the plane of the figure, and the plain conductors 32 of coil 11 and the plain conductors 33 of coil 12 are those conductors in which current flows out of the plane of the figure. The conductor group 30, therefore, generates clockwise flux loops and conductor group 33 generates counter-clockwise flux loops. Accordingly, the lowermost flux lines generated by conductor group 30 and the uppermost flux lines generated by conductor group 33 combine to develop resulting flux lines which are parallel to the plane of sheet 10 and directed to the left of the figure.

Conductor group 32 generates counter-clockwise flux loops and conductor group 31 generates clockwise flux loops. Accordingly, the lowermost flux lines generated by group 32 and the uppermost flux lines generated by group 31 combine to form resulting lines which are in the plane of sheet 10. These resulting lines are directed to the right of the figure.

Figure 4:
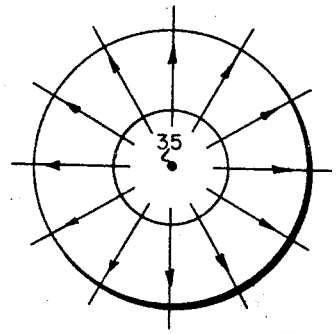
FIG. 4 is a diagram of the radial components of the radio-frequency field generated in the view of FIG. 3.

The foregoing magnet and coil assembly thus generates radio-frequency flux between the two coils 11 and 12 which is essentially radial to the common axis 35 of the two coils as is shown in FIG. 4, except at points near the axis 35 of the two coils and beyond the outer perimeter. In the median plane between the two coils, the position of sheet 10 shown, the radial component of the flux density $H_1$ is strongest near the inner radius and decreases toward the outer radius approximately as $$\frac{1}{r}$$

There is very little variation in $H_1$ (radial), however, along directions parallel to the coil axis in the space between the coils. This is especially true at points midway between the coils in the median plane. Due to the increased flux density between the coils, a reasonable "filling factor" is obtainable with coil spacings of a few sample thicknesses.

In addition to the above desirable characteristics, the relatively flat geometry of coils 11 and 12 provides a more efficient and closer spacing of the pole faces generating the external field $H_0$, thereby resulting in higher field intensities and better homogeneity. Both of these effects enhance the signal-to-noise ratio of the measuring apparatus and also the accuracy.

It should be understood that the above described arrangements are merely illustrative of the features of this invention and that numerous other arrangements may be devised without departing from this scope of the invention.

What is claimed is:

1. In nuclear magnetic resonance measuring apparatus for subjecting flat sheet material to be analyzed to mutually perpendicular magnetic and radio-frequency fields including a resonant tank circuit developing an output signal responsive to a condition of nuclear resonance between the fields and for the material under measurement, the improvement comprising a pair of relatively flat coils axially aligned and spaced in a parallel relationship with respect to one another and included in said resonant tank circuit, a radio-frequency source energizing said coils to produce opposing radio-frequency magnetic fields in the common space therebetween with axial components cancelling one another and radial components reinforcing one another, means adapted to support the flat sheet material under measurement in the space between the coils, and a pair of spaced magnet poles developing a second magnetic field passing through said coils and parallel to the axis thereof.

2. In nuclear magnetic resonance measuring apparatus for subjecting flat sheet material to be analyzed to mutually perpendicular magnetic and radio-frequency fields including a resonant tank circuit developing an output signal responsive to a condition of nuclear resonance between the fields and for the material under measurement, the improvement comprising a pair of relatively flat coils axially aligned and spaced in a parallel relationship with respect to one another and included in said resonant tank circuit, a radio-frequency source energizing said coils to produce opposing radio-frequency magnetic fields in the common space therebetween with axial components cancelling one another and radial components reinforcing one another, means adapted to support the flat sheet material under measurement midway between the coils and perpendicular to the axis thereof, and a pair of spaced magnet poles developing a second magnetic field passing through said coils and parallel to the axis thereof.

3. In a nuclear measuring apparatus substantially as set forth in claim 2 wherein said flat parallel coils are images of one another in the median plane.

4. In a measuring system substantially as set forth in claim 2 wherein said pair of flat parallel coils are thin relative to the flat plane thereof.

5. In a measuring system substantially as set forth in claim 2 wherein said flat parallel coils are of a configuration in the plane thereof to provide optimum filling factor.

6. In a measuring system substantially as set forth in claim 2 wherein said flat parallel coils are of a spiral configuration in the plane thereof.

7. In nuclear magnetic resonance measuring apparatus for subjecting a material to be analyzed to mutually perpendicular magnetic and radio-frequency fields including a resonant tank circuit developing an output signal responsive to a condition of nuclear resonance between the fields and for the material under measurement, the improvement comprising a pair of relatively flat coils disposed on a common axis and interconnected relative one another to develop opposing magnetic fields in the space between the coils and generating reinforcing resulting lines of magnetic flux radially emanating from said axis, a radio-frequency source energizing both of said coils, means adapted to support the material under measurement in the space between the coils, and a pair of spaced magnet poles developing a second magnetic field passing through said coils and parallel to the common axis thereof.

8. In nuclear magnetic resonance measuring apparatus for subjecting a material to be analyzed to mutually perpendicular magnetic and radio-frequency fields including a resonant tank circuit developing an output voltage responsive to a condition of nuclear resonance between the fields and for the material under measurement, the improvement comprising a pair of relatively flat coils each formed with a center opening and included in said resonant tank circuit, said coils being spaced in a parallel relationship with respect to one another and symmetrically disposed on a common axis passing through the center of said coils, a radio-frequency source energizing said coils to produce opposing radio-frequency magnetic fields in the common space therebetween having reinforcing resulting components radially emanating from said axis, means adapted to support the material under measurement in the space between the coils, and a pair of spaced magnet poles developing a second magnetic field passing through said coils and parallel to the axis thereof.

9. In nuclear magnetic resonance measuring apparatus for subjecting flat sheet material to be analyzed to mutually perpendicular magnetic and radio-frequency fields including a resonant tank circuit developing an output voltage responsive to a condition of nuclear resonance between the fields and for the material under measurement, the improvement comprising a pair of relatively flat coils each formed with a center opening and included in said resonant tank circuit, said coils being spaced in a parallel relationship with respect to one another and symmetrically disposed on a common axis passing through the center of said coils, a radio-frequency source energizing said coils to produce opposing radio-frequency magnetic fields in the common space therebetween having reinforcing resulting components radially emanating from said axis, means adapted to support the sheet material under measurement midway between the coils and perpendicular to axis, and a pair of spaced magnet poles developing a second magnetic field passing through said coils and parallel to the axis thereof.

10. In a nuclear measuring apparatus substantially as set forth in claim 9 wherein said flat parallel coils are images of one another in the median plane.

References Cited in the file of this patent

UNITED STATES PATENTS

| | | |
|---|---|---|
| 2,419,116 | Cassen et al. | Apr. 15, 1947 |
| 2,505,778 | Limbach | May 2, 1950 |
| 2,557,393 | Rifenbergh | June 19, 1951 |
| 2,799,823 | Shaw et al. | July 16, 1957 |
| 2,839,650 | White et al. | June 17, 1958 |
| 2,882,378 | Ticehurst | Apr. 14, 1959 |
| 2,944,212 | Malling et al. | July 5, 1960 |

FOREIGN PATENTS

| | | |
|---|---|---|
| 967,030 | France | Mar. 15, 1950 |
| 840,276 | Germany | May 29, 1952 |
| 1,141,373 | France | Mar. 18, 1957 |

OTHER REFERENCES

Foner et al.: The Review of Scientific Instruments, vol. 28, No. 12, published Oct. 1957, pp. 799–807.